United States Patent
Torney et al.

(10) Patent No.: US 7,497,189 B2
(45) Date of Patent: Mar. 3, 2009

(54) DOG CHEW

(75) Inventors: Allan A. Torney, Brampton (CA);
Emine Unlu, Murfreesboro, TN (US);
Neil Willcocks, Brentwood, TN (US);
Kasim Zubair, Brampton (CA); Tiffany L. Bierer, Brentwood, TN (US)

(73) Assignee: Mars, Incorporated, McLean, VA (US)

( * ) Notice: Subject to any disclaimer, the term of this patent is extended or adjusted under 35 U.S.C. 154(b) by 54 days.

(21) Appl. No.: 11/766,314

(22) Filed: Jun. 21, 2007

(65) Prior Publication Data
US 2008/0041320 A1     Feb. 21, 2008

Related U.S. Application Data

(60) Provisional application No. 60/815,713, filed on Jun. 21, 2006.

(51) Int. Cl.
A01K 29/00    (2006.01)
A61D 5/00     (2006.01)

(52) U.S. Cl. ..................................... 119/709
(58) Field of Classification Search ................. 119/709, 119/710, 711, 702, 707, 708
See application file for complete search history.

(56) References Cited

U.S. PATENT DOCUMENTS

| | | | | |
|---|---|---|---|---|
| 3,458,268 | A | * | 7/1969 | Wozab et al. .............. 401/261 |
| 4,149,815 | A | * | 4/1979 | Kawam ...................... 401/201 |
| D338,993 | S | * | 9/1993 | Lilly ............................ D1/106 |
| 5,263,436 | A | * | 11/1993 | Axelrod ....................... 119/710 |
| 5,647,302 | A | * | 7/1997 | Shipp .......................... 119/709 |
| 5,755,184 | A |   | 5/1998 | Neidenberger |
| D418,639 | S | * | 1/2000 | Simon ........................ D30/160 |
| 6,116,191 | A | * | 9/2000 | Suchowski et al. .......... 119/709 |
| 6,305,326 | B1 | * | 10/2001 | Suchowski et al. .......... 119/709 |
| D453,242 | S | * | 1/2002 | Kaplan ....................... D30/160 |
| D473,683 | S | * | 4/2003 | Willinger ................... D30/160 |
| 6,602,013 | B2 | * | 8/2003 | Clark .......................... 401/282 |

(Continued)

FOREIGN PATENT DOCUMENTS

DE        43 15 124        11/1994

OTHER PUBLICATIONS

Greenies® the Original Smart Treat for Dogs and Other Pets, S&M Nutec, LLC, © 2005, http://web.archive.org/web/2005103010405/ www.greenies.com/aboutUs.cfm (Last visited Apr. 16, 2008).

*Primary Examiner*—Yvonne R. Abbott
(74) *Attorney, Agent, or Firm*—Fitzpatrick, Cella, Harper & Scinto

(57) ABSTRACT

A dog chew made of extruded, edible material has a brush-shaped head at one end and a tail at the other. The brush-shaped head and tail are connected to the head by a shaft. The brush-shaped head is provided with segments (for example six segments) with spaces between the segments adapted to be more easily manipulated in a dog's mouth, so that smaller pieces break off when a dog bites and chews the article. Thus, the brush-shaped head may contain individual segments having an elliptical cross section, so that a dog's tooth can work between the individual segments or "bristles." Elsewhere on the profile of the dog chew, stepped surfaces are avoided in favor of smooth, rounded surfaces, so that the dog chew is more easily handled in the dog's mouth and has an aesthetically pleasing appearance.

10 Claims, 2 Drawing Sheets

U.S. PATENT DOCUMENTS

| | | | |
|---|---|---|---|
| 6,688,258 B1 | | 2/2004 | Kolesar |
| 6,739,287 B1 | * | 5/2004 | Sarantis ..................... 119/709 |
| 6,769,828 B2 | * | 8/2004 | Clark ......................... 401/284 |
| D499,226 S | * | 12/2004 | Axelrod ..................... D1/106 |
| D529,667 S | * | 10/2006 | Axelrod ..................... D30/160 |
| D530,481 S | * | 10/2006 | Koenig et al. ................ D1/125 |
| D531,365 S | * | 10/2006 | Axelrod ..................... D30/160 |
| D531,383 S | * | 11/2006 | Dettmer et al. ............... D1/111 |
| 7,165,907 B2 | * | 1/2007 | Levy ........................... 401/183 |
| 7,273,327 B2 | * | 9/2007 | Hohlbein et al. ............ 401/132 |
| D568,487 S | * | 5/2008 | Hsu ........................... D24/214 |
| 2002/0083539 A1 | * | 7/2002 | Bella .......................... 15/106 |
| 2002/0106234 A1 | * | 8/2002 | Johnson ..................... 401/134 |
| 2006/0102099 A1 | * | 5/2006 | Edwards ..................... 119/710 |
| 2007/0013104 A1 | * | 1/2007 | Axelrod ..................... 264/297.2 |
| 2007/0044730 A1 | * | 3/2007 | Axelrod et al. .............. 119/709 |
| 2007/0101946 A1 | * | 5/2007 | Penny ........................ 119/709 |

* cited by examiner

DOG CHEW

This application claims the benefit of U.S. Provisional Application No. 60/815,713, filed Jun. 21, 2006, which is incorporated by reference.

BACKGROUND OF THE INVENTION

1. Field of the Invention

The invention relates to a dog chew having a shape so that the dog chew is more easily chewed by a dog, and less dangerous if swallowed.

2. Description of Related Art

The dog chew of the present invention is an improvement over the known Greenies® brand of dog chew. The Greenies® dog chew comprises a brush-shaped head at one end, a generally rectangular shaft, and a knuckle or bone shaped portion at the opposite end. This brand of dog chew is popular, and the brush and bone shapes simultaneously convey to the consumer the dental hygiene and canine enjoyment aspects of the chew. While this prior art product has been well received, it is believed that improvements can be made thereon based on the way a dog chews and eventually swallows edible chews.

In particular, it would be highly desirable to improve the manipulation of the chew in the dog's mouth and reduce the potential for large pieces to be broken off when a dog bites into the chew. The present invention is directed to achieve the aforementioned goals.

SUMMARY OF THE INVENTION

A dog chew according to the invention comprises a brush-shaped head having a plurality of segments. The segments approximate the "bristles" of the brush. The segments have angled spaces between them, so that when a dog bites the head, the natural shape of a dog's tooth is accommodated by being able to fit into these spaces, increasing the contact between the product and the tooth. A tail, opposite the head, is connected to the head by a shaft. Thus the head and tail form opposite extremities of the dog chew. In preferred embodiments, the tail is bone-shaped, and at least one groove extends from the tail along the shaft. The groove increases the fracturability of the chew in that area as well as guiding a dog's teeth to that area when the dog is in the process of biting the chew.

DETAILED DESCRIPTION

Figure 1A:
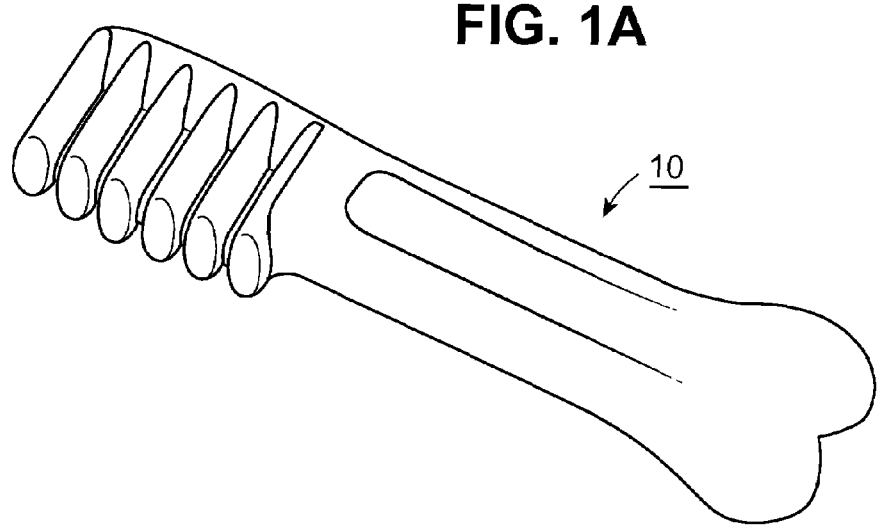
FIG. 1A, FIG. 1B and FIG. 1C show several views of a dog chew according to the invention.
Figure 1B:
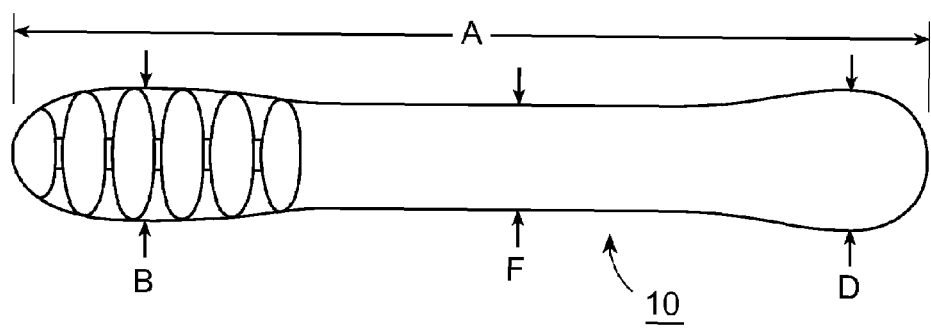
Figure 1C:
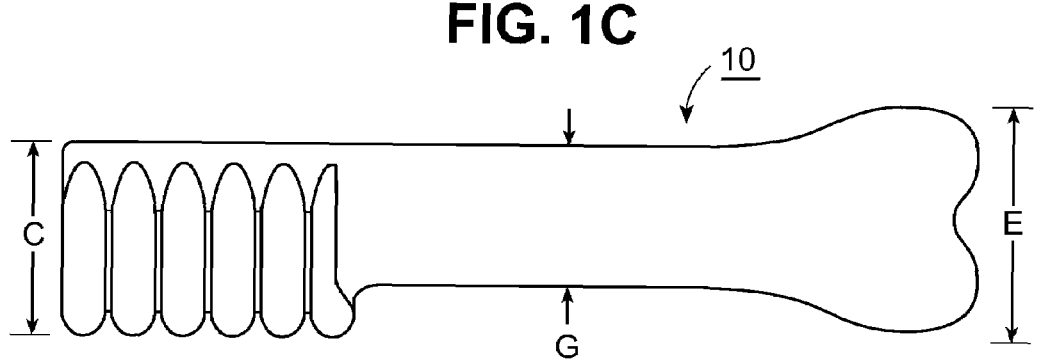
Figure 2A:
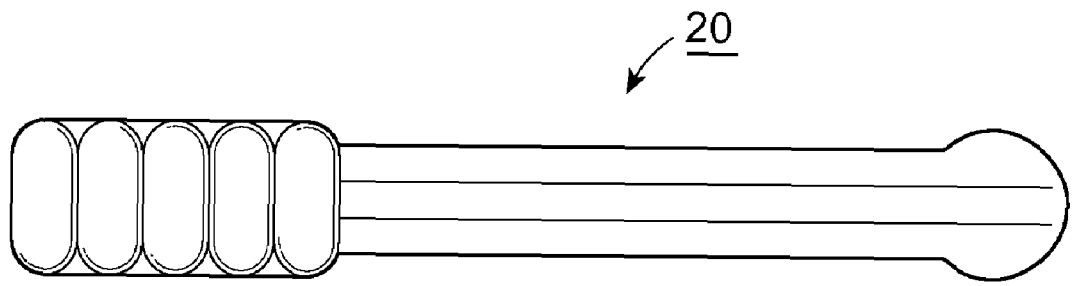
FIG. 2A and FIG. 2B show two views of a Greenies® brand dog chew according to the prior art.
Figure 2B:
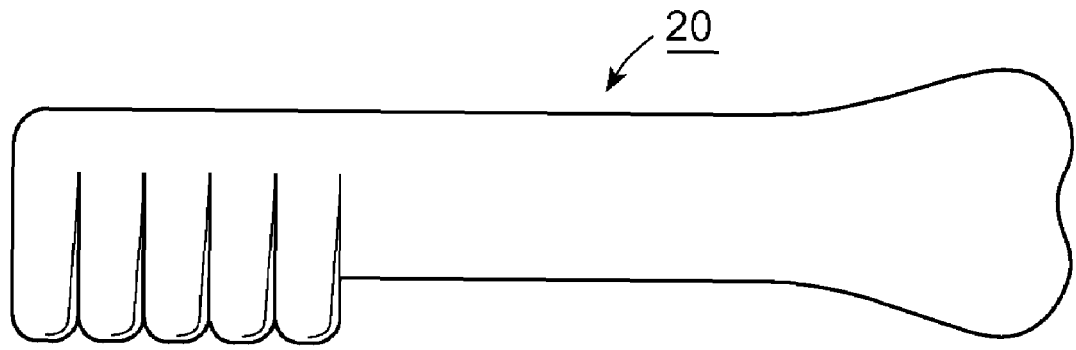

As seen in the specific embodiment of FIG. 1, the dog chew has a length "A" and comprises a brush-shaped head at one end and a bone-shaped tail at the opposite end. Generally, the length A is in a range of about 5.0 cm to about 20.0 cm, preferably in a range of about 6.5 cm to about 16.0 cm. The chew may be provided in different lengths, appropriate for different sized dogs. Thus, the smallest ("Teenie") size chew preferably has a length in a range of about 5.0 cm to about 7.5 cm, most preferably about 6.636 cm to about 7.334 cm. A somewhat larger, but still small ("Petite") size chew preferably has a length in a range from greater than about 7.5 cm to about 9.9 cm, and most preferably in a range of about 8.634 cm to about 9.543 cm. A medium ("Regular") size chew preferably has a length in a range from greater than about 9.9 cm to about 11.7 cm, and most preferably in a range of about 9.954 cm to about 11.001 cm. A still larger ("Large") size chew preferably has a length in a range from about 11.7 cm to about 13.0 cm, and preferably in a range of about 11.725 cm to about 12.959 cm. A chew appropriate for the largest dogs ("Jumbo") preferably has a length in a range of greater than about 13.0 cm to about 16.0, and preferably in a range of about 14.176 cm to about 15.669 cm. However, any size chew, or different combinations of chews, could be offered within the general ranges given above.

While not limiting of the invention, the Teenie size chew is targeted for a dog having a weight in a range of about 5 lbs to about 15 lbs, the Petite size chew is targeted for a dog having a weight in a range of about 15 lbs to about 25 lbs, the Regular size chew is targeted for a dog having a weight in a range of about 25 lbs to about 50 lbs, the Large size chew is targeted for a dog having a weight in a range of about 50 lbs to 100 lbs, and a Jumbo size chew is targeted for a dog in the 100 lb weight range and higher.

The chew is an extruded, thermoplastic edible mass, which may be formed by injection molding or other suitable molding technique. Suitable compositions for the dog chew may have a density in a range of about 1.2 g/cc to about 1.3 g/cc, such that the mass of the chew may be in a range of about 5.0 g to about 125.0 g, preferably in a range of about 8.0 g to about 86.0 g. A Teenie chew preferably has a mass less than about 10 g, most preferably in the range of 8.259 g to 8.947 g. A Petite chew preferably has a mass in a range of greater than about 10 g to about 20 g, most preferably in a range of 17.600 g to 19.066 g. A Regular chew preferably has a mass in a range of greater than about 20 g to about 30 g, most preferably in the range of 27.098 g to 29.356 g. A Large chew preferably has a mass in a range of greater than about 30 g to about 50 g, most preferably in a range of 44.127 g to 47.804 g. A Jumbo chew preferably has a mass in a range of greater than about 50 g to about 100 g, most preferably in a range of 78.658 g to 85.213 g.

The brush-shaped head has a plurality of segments, approximating "bristles." In preferred embodiments, these bristle segments are approximately parallel. Increasing the number of bristles within the same length head introduces more break points into the head, resulting in smaller pieces being broken off when a dog bites on the chew. This increases the solubility of the pieces in the dog's digestive tract by increasing the surface area. Thus, preferably a chew according to the invention has four to eight segments, and most preferably there are six segments, whereas the prior art Greenies® product has five segments, with little or no space between the segments.

The side of the dog chew with the "bristles" is referred to herein as the top of the chew. As seen from the top, the bristle segments have a cross section adapted to increase the space between the segments and thereby increase the surface area of the chew in contact with the tooth. Thus, in one aspect of the invention, the bristle segments are shaped so that a space between adjacent bristle segments forms an angle, widest at the opening on the side of the brush-shaped head and narrowing to a vertex in the direction of the centerline of the chew. A dog's tooth has the same general shape, wider at the base and pointed. Thus the shape, and specifically the space between bristle segments, promotes contact of the chew with the dog's tooth. This contact of a dog's tooth with the chew, in addition to the contact arising from the penetration of a dog's tooth into the body of the chew, results in a cleaning action on the dog's teeth.

In embodiments, the distance from the vertex of the angled space to the side of the brush-shaped head (the width of the space) is more than about 10 percent of the distance from the side of the chew to the centerline of the chew. Preferably, the width of the space is more than about 15 percent of that distance, and most preferably more than about 20 percent of that distance. For example only, a "Teenie" chew having maximum bristle thickness dimension "B" of about 1 cm, as shown in FIG. 1, would most preferably have a space between adjacent segments extending more than about 0.1 cm toward the centerline at the deepest point, 0.1 cm being 20 percent of the distance from the side of the chew to the centerline. The spaces are found on both sides of the brush-shaped head.

In a particularly preferred embodiment, again as shown in FIG. 1, the bristle segments have an elliptical cross section forming an angled space between them. As noted above, this is a departure from the prior art, in that angled spaces are formed between the segments to accommodate a dog's teeth. Further, a dog's pre-molars, which are the slicing teeth, will engage these angled spaces between elliptical segments, rather than sliding along the side, making it easier for a smaller piece of the edible mass to be torn off. A dog's teeth will act as a wedge at these angled spaces, causing the dog chew to break along predetermined fracture lines when the dog chews on the product. In embodiments, the angle formed at the vertex between adjacent bristle segments is at least about 15 degrees, preferably greater than about 20 degrees, and more preferably greater than about 25 degrees, measured from a first side formed by a line perpendicular to the side of the chew and a second side formed by a line just touching the adjacent segment, and meeting the first side at the vertex.

As shown in FIG. 1, the head has thickness "B" and the tail has a thickness "D." In preferred embodiments, both the head and the tail are thicker than the shaft. This is similar to the design of the prior art Greenies® product. However, in a departure from the prior art, gently sloping surfaces are provided connecting the shaft and the tail to the head. Sloping in this context simply means that there is no surface perpendicular, or nearly perpendicular, to the longitudinal axis of the dog chew, at the point where the brush-shaped head meets the shaft. This is to prevent a dog catching its tooth at this point, and makes the product more easily manipulated in a dog's mouth, as the tooth slides along this sloped portion and is guided into the groove along the shaft.

As shown in FIG. 1, the brush-shaped head and the tail have heights "C" and "E," respectively, larger than the height "G" of the shaft. Thus, for example only, and without intending to limit the invention, if the shaft height G is in a range of about 1.054 cm to about 1.165 cm for a "Teenie" size dog chew, then the maximum height of the bone section may be in a range of about 1.658 cm to about 1.832 cm, and the maximum height for the brush-shaped head section may be in a range of about 1.431 cm to about 1.582 cm. For a "Petite" size chew, having a shaft height in a range of about 1.356 cm to about 1.499 cm, the maximum height of the bone section may be in a range of about 2.148 cm to about 2.374 cm and the maximum height of the brush-shaped head section may be in a range of about 1.846 cm to about 2.040 cm. For a "Regular" size chew, having a shaft thickness in a range of about 1.573 cm to about 1.739 cm, the maximum height of the bone section may be in a range of about 2.488 cm to about 2.750 cm, and the maximum height of the brush-shaped head section may be in a range of about 2.111 cm to about 2.334 cm. For a "Large" size chew, having a shaft thickness in a range of about 1.844 cm to about 2.038 cm, the maximum height of the bone section may be in a range of about 2.939 cm to about 3.248 cm and the maximum height of the brush-shaped head section may be in a range of about 2.452 cm to about 2.710 cm. For a "Jumbo" size chew, having a shaft height in a range of about 2.312 cm to about 2.555 cm, the maximum height of the bone section may be in a range of about 2.818 cm to about 3.115 cm and the maximum height of the brush-shaped head section may be in a range of about 3.052 cm to about 3.374 cm. These dimensions are exemplary only, illustrating preferred proportions for the shape of the chew.

The top of the brush-shaped head is preferably rounded, which shape is more comfortably manipulated in a dog's mouth, in addition to providing a pleasing appearance.

In preferred embodiments, the tail of the dog chew according to the invention is in the shape of what is universally understood as being one half of a dog bone icon, having two approximately equal, rounded protuberances extending away from the approximately parallel sides of a shaft, and having a height relative to the shaft as set forth above. Thus, "bone shaped" in the context of the present application does not refer to any particular bone, but to a dog bone icon.

As also shown in FIG. 1, the inventive dog chew is preferably dimensioned so that a brush-shaped head and a bone-shaped tail each have a maximum thickness thicker than the shaft thickness "F." To illustrate suitable proportions, and without intending to limit the invention, a suitable dog chew having a shaft thickness F in a range of about 0.767 cm to about 0.848 cm may have a maximum bristle thickness in a range of about 0.980 cm to about 1.083 cm and a maximum tail thickness in a range of about 1.054 cm to about 1.165 cm. For a somewhat larger, but still small dog, a suitable dog chew having a shaft thickness F in a range of about 0.987 cm to about 1.091 cm may have a maximum bristle thickness in a range of about 1.281 cm to about 1.116 cm and a maximum tail thickness in a range of about 1.356 cm to about 1.499 cm. For a medium-sized dog, a suitable dog chew having a shaft thickness F in a range of about 1.110 cm to about 1.227 cm may have a maximum bristle thickness in a range of about 1.470 cm to about 1.624 cm and a maximum tail thickness in a range of about 1.583 cm to about 1.750 cm. A large dog, may require a dog chew having shaft thickness F in a range of about 1.303 cm to about 1.440 cm, in which case, the brush-shaped head may have a suitable maximum thickness in a range of about 1.733 cm to about 1.915 cm and a tail thickness in a range of about 1.846 cm to about 2.040 cm. A still larger dog may use a Jumbo dog chew having a shaft thickness F of 1.578 cm to about 1.744 cm, in which case, the maximum thickness of the brush-shaped head is suitably in a range of about 2.261 cm to about 2.499 cm and the maximum thickness of the tail may suitably be in a range of about 2.111 cm to about 2.334 cm. Again, these dimensions are exemplary, intended to show the preferred proportions of different sizes of the preferred embodiments.

The shaft is preferably provided with at least one groove so that fracture lines preferentially form in that area when a dog bites on the chew. The groove is the thinnest part of the shaft, and therefore the chew is more apt to break at that point. More preferably, grooves extend along both sides of the shaft from the tail almost to the brush-shaped head. As shown in FIG. 1, the thickness of the shaft where the sides are approximately parallel, before they begin sloping toward the brush-shaped head or bone-shaped tail, is given by dimension "F." The thickness of the shaft between the deepest point of a groove and an opposite side (or between two opposing grooves on opposite sides), is preferably in a range of about 30 to about 85 percent of the dimension F, more preferably in a range of about 40 percent to about 75 percent of the thickness F of the shaft.

The sides of the at least one groove may be angled so that a dog's teeth, and especially the pre-molars, act as a wedge, forcing the sides apart when a dog bites on the chew in that area. In embodiments, the groove runs substantially the length of the shaft, starting at a narrower portion where the two protuberances of the bone-shaped tail meet the shaft, and ending just short of the brush-shaped head.

Prior art compositions known to be useful in this context and methods of extruding them are disclosed for example in U.S. patent application Ser. No. 11/060,943, herein incorporated by reference. Compositions may be developed with improved solubility, as described in U.S. Provisional Patent Application corresponding to 60/815,682, herein incorporated by reference.

As described above, the angled spaces between the segments of the brush-shaped head and the groove along the shaft create predetermined fracture lines so that the dog chew breaks along those lines when the dog chews on it. The composition of the dog chew may be selected to enhance the effect of these predetermined fracture lines. A composition that yields a softer, more elastic dog chew, will also tend to assist the breakage along the predetermined fracture lines, rather than along crystal lines of the extruded product. A composition may be formulated to enhance the ability of product to be sheared apart with a wedge action of a dog's teeth. Compositions described in the aforesaid U.S. Provisional Patent Application identified with 60/815,682 may be adapted for this purpose.

What is claimed is:

1. A dog chew, comprising:
   a brush-shaped head having a plurality of segments;
   an angled space between adjacent segments that is widest at the side of the brush shaped head and narrows to a vertex toward the centerline of the brush-shaped head, adapted to accommodate a canine tooth;
   a tail opposite the head;
   a shaft connecting the head and the tail, such that the head and tail form opposite extremities of the dog chew.

2. The dog chew according claim 1, constructed of extruded, thermoplastic edible material.

3. The dog chew according to claim 1, wherein the distance from the vertex of the angled space to the side of the brush-shaped head is more than about 10 percent of the distance from the centerline of the brush-shaped head to the side of the brush-shaped head.

4. The dog chew according to claim 1, wherein the brush-shaped head has a rounded end.

5. The dog chew according to claim 1, wherein the segments of the brush-shaped head have an elliptical cross-section so that spaces having angled sides are formed between the segments.

6. The dog chew according to claim 1, wherein the brush-shaped head is thicker than the shaft and has greater height than the shaft, and the shaft is connected to the brush-shaped head by sloping sides on the shaft.

7. The dog chew according to claim 1, wherein the tail is bone-shaped, comprising two approximately equal protuberances extending from approximately parallel sides of the shaft, and wherein the bone-shaped tail is thicker than the shaft and has greater height than the shaft.

8. The dog chew according to claim 1, having a length in a range of about 5.0 cm to about 15 cm and a mass in a range of about 5.0 g to about 125.0 g.

9. The dog chew according to claim 1, wherein the density of the dog chew is in a range of about 1.2 to about 1.3 g/cc.

10. The dog chew according to claim 1,
   wherein segments of the brush-shaped head have an elliptical cross-section so that spaces having angled sides are formed between the segments;
   wherein the shaft is generally rectangular, having a shaft thickness and a shaft height measured at a point where opposing sides of the shaft are approximately parallel;
   wherein the brush-shaped head is rounded and has a maximum thickness greater than the shaft thickness;
   wherein the tail is bone-shaped, comprising two approximately equal protuberances extending from the shaft, the bone-shaped tail being thicker than the shaft thickness and having greater height than the shaft height; and
   wherein at least one groove extends along the shaft between the bone-shaped tail and the brush-shaped head.

* * * * *